United States Patent Office 3,839,555
Patented Oct. 1, 1974

3,839,555
VACCINE ADJUVANT AND METHOD
Alfons Billiau, Kellel, and Pierre De Somer, Leuven, Belgium, assignors to Recherche et Industries Therapeutiques, R.I.T. Belgium
No Drawing. Filed Mar. 26, 1971, Ser. No. 128,530
Int. Cl. C12k 5/00
U.S. Cl. 424—89
9 Claims

ABSTRACT OF THE DISCLOSURE

Oxidized polysaccharides, particularly amylose oxidized successively with periodate and chlorite, are useful as vaccine adjuvants.

---

This invention relates to a new vaccine adjuvant, to a method of increasing the antigenic potency of vaccines by means of the adjuvant, and to vaccine compositions containing the adjuvant.

The adjuvants of this invention are polyacetal carboxylic acids and pharmaceutically acceptable salts thereof, said polyacetal carboxylic acids being oxidized polysaccharides having at least 50% of the monosaccharide rings opened, substantially all the open rings oxidized to the carboxylic acid state, and substantially all the carbon-oxygen-carbon linkages originally present in the polysaccharide intact.

More particularly, the adjuvants of this invention are polyacetal carboxylic acids derived by oxidation from amylose, amylopectin, dextran, polygalacturonic acid, alginic acid, and guaran. They are prepared by a two-stage oxidation process, first, by cleaving the monosaccharide ring to yield a dialdehyde and second, by oxidizing each aldehyde group to the carboxylic acid state. The first stage is carried out using o- or m-periodic acid or an alkaline salt thereof or any usual glycol cleaving agent such as lead tetraacetate, sodium bismuthate, or ruthenium tetroxide. The second stage is carried out using a chlorite, a bromite, dinitrogen tetroxide, bromine, chlorine, a hypochlorite or a hypobromite; the preferred agents are chlorite and bromite, which convert substantially all the opened rings to the carboxylic acid state and leave the carbon-oxygen-carbon linkages substantially intact.

As a result of the first oxidation step, at least 50% and probably at least 60% of the monosaccharide rings will have been opened, the rings breaking at carbon-carbons bonds. The second oxidative step converts substantially all the cleaved carbon atoms to the carboxylic acid state.

For instance, in the case of a 1,4-polyglycan, the pyranose ring opens between positions 2 and 3 to give a copolymer of formula I, $$\left[ \begin{array}{c} -CH-\!\!\!-\!\!\!-CH-O-CH-O-\\ | \quad\quad\quad\quad | \\ COOH \quad\, X \end{array} \right] \left[ \begin{array}{c} -CH-\\ | \\ COOH \end{array} \right]_m \left[ \begin{array}{c} CHY-\!\!\!-\!\!\!-O\\ / \quad\quad\quad \backslash \\ CH \quad\quad\quad CH-O-\\ \backslash \quad\quad\quad / \\ CHOH-CHOH \end{array} \right]_n$$

I wherein X is equivalent to Y and represents COOH or $CH_2OH$, or X and Y represent chains of formula A,

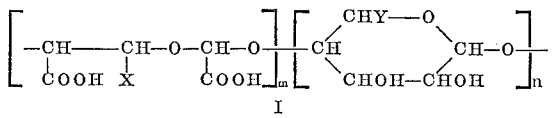

A or X is different from Y, one of them representing $CH_2OH$ and the other one representing a chain of the formula A, B, or C,

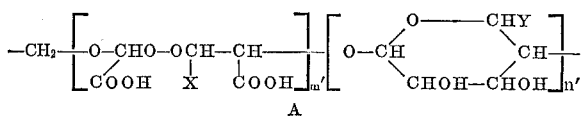

and m and n, which are identical with or different from m' and n', represent molar fractions comprised between 0.5 and 1 and between 0.5 and 0, respectively, and, preferably, between 0.6 and 1 and 0.4 and 0, respectively.

Compounds of formula I wherein X and Y are $CH_2OH$ are obtained for instance from amylose, cellulose, galactan and ivory nut mannan.

Compounds of formula I where X and Y are COOH are obtained for instance from polygalacturonic acid and alginic acid.

Compounds of formula I wherein X and Y are identical or different and represent either $CH_2OH$ or the above defined chain A are obtained for instance from amylopectin, glycogen and yeast mannan.

Compounds of formula I wherein X and Y are different, one of them representing $CH_2OH$ and the other one representing either the above defined unit B or the above defined unit C are obtained for instance from guaran.

In the case of a 1,6-polyglycan such as dextran, the ring opens between positions 2, 3 and 4, to give (as far as 1→3 and 1→4 branchings are not involved) a chain of formula II, $$\left[ \begin{array}{c} -CH_2-CH-O-CH-O-\\ | \quad\quad\quad | \\ COOH \quad COOH \end{array} \right]_m \left[ \begin{array}{c} -CH_2\\ | \\ CH-\!\!\!-\!\!\!-O\\ / \quad\quad\, \backslash \\ CHOH \quad\quad CH-O-\\ \backslash \quad\quad\, / \\ CHOH-CHOH \end{array} \right]_n$$

II wherein m and n are as above defined.

The preferred adjuvant of this invention is a linear condensation copolymer containing 1,4-linked anhydro-α-D-glucopyranose units and 1,4-linked anhydro-1,4-dihydroxy-1,4-dicarboxy-3-hydroxymethyl-2 - oxabutane units (COAM). It is obtained by oxidation of amylose with sodium metaperiodate and then with sodium chlorite. It has been found to be a highly effective vaccine adjuvant.

The vaccine adjuvant effect of COAM has been demonstrated as follows: Groups of 12 mice were injected intraperitoneally with one of the following formulations: influenza vaccine ($A_2$ Hongkong/1/1968 or B/Neth strains), vaccine plus COAM, vaccine plus incomplete Freund adjuvant (IFA), vaccine plus polyinosinic-polycytidylic acid (poly I—C), vaccine plus IFA and poly I—C, and vaccine plus IFA and COAM. The dosages were 0.0625 ml. of vaccine per mouse, 25 μg of poly I—C per mouse, 4 mg. of COAM per mouse, and 0.125 ml. of IFA per mouse. The experiment was done on 3 sets of mice which were bled at 7, 14 and 28 days post-injection. The mice were bled at the orbital sinus and blood was immediately diluted 1:5 in phosphate buffered saline. Antibody titers were determined on individual samples using the hemagglutination-inhibition test. The vaccine contained 10,500 HA units/ml. of $A_2$ Hk/1/1968 strain or 7,500 HA units/ml. of B/Neth strain.

The results obtained are presented below in Tables I and II.

TABLE I

Average HA—I—Titer of mice treated with vaccine (A, Hk strain), COAM, poly I—C and IFA [1]

| Treatment | Titer (days) at— | | |
|---|---|---|---|
| | 7 | 14 | 21 |
| Vaccine only | <10 | <10 | <10 |
| Vaccine plus poly I—C | <10 | 16 | 20 |
| Vaccine plus COAM | 44 | 66 | 200 |
| Vaccine plus IFA | <10 | 26 | 63 |
| Vaccine plus IFA plus poly I—C | <10 | 40 | 220 |
| Vaccine plus IFA plus COAM | 32 | 90 | 350 |

[1] Serum samples were assayed individually. Values shown in the table are reciprocals of geometric means of end-point dilutions.

TABLE II

Average HA—I—titer of mice treated with vaccine (B/Neth strain), COAM, poly I—C and IFA [1]

| Treatment | Titer (days) at— | | |
|---|---|---|---|
| | 7 | 14 | 21 |
| Vaccine only | 50 | 71 | 25 |
| Vaccine plus poly I—C | 80 | 160 | 32 |
| Vaccine plus COAM | 320 | 550 | 100 |
| Vaccine plus IFA | 160 | 200 | 80 |
| Vaccine plus IFA plus poly I—C | 220 | 370 | 210 |
| Vaccine plus IFA plus COAM | 210 | 500 | 280 |

[1] Serum samples were assayed individually. Values shown in the table are reciprocals of geometric means of end-point dilutions.

The results indicate that at a dosage of 160 mg./kg. in mice, COAM, either alone or in combination with IFA, produced antibody titers considerably higher than with the vaccine alone. It was also superior to IFA or poly I—C.

Further studies on enhancement of influenza vaccine were done on guinea pigs. In a first experiment it was determined that an adjuvant effect was obtained after intramuscular as well as after intraperitoneal injection. The effect of dose of COAM was also studied: one group of guinea pigs received the same formulation as the mice, i.e. 4 mg. of COAM per dose of vaccine. A second group was given the same dose of COAM as mice but calculated on a weight basis, i.e. 40 mg. per guinea pig. It was reasoned that this would give an indication as to whether adjuvant activity was due to local or systemic effects. Groups of 10 guinea pigs were used. They were given 0.5 ml. of vaccine containing A equi/1 antigen. Antibodies were determined at 3, 6, 9 and 12 weeks after vaccination. Average values are summarized in Table III.

TABLE III

Adjuvant effect of COAM on antibody induction by influenza vaccine in guinea pigs

| Vaccination schedule [1] | Antibody titers,[2] weeks at— | | | |
|---|---|---|---|---|
| | 3 | 6 | 9 | 12 |
| Intramuscular vaccination: | | | | |
| Vaccine only | 96 | 80 | 85 | 30 |
| Vaccine plus COAM, 4 mg | 216 | 108 | 112 | 60 |
| Vaccine plus COAM, 40 mg | 368 | 270 | 182 | 112 |
| Intraperitoneal vaccination: | | | | |
| Vaccine only | 120 | 158 | 91 | 28 |
| Vaccine plus COAM, 4 mg | 209 | 138 | 98 | 37 |
| Vacicne plus COAM, 40 mg | 446 | 364 | 295 | 98 |

[1] Formulations were such that the animals received 0.5 ml. of A equi/1 vaccine, mixed with 0.5 ml. of either saline or COAM at the indicated doses.
[2] Serum samples were assayed individually. Values shown in the table are reciprocals of geometric means of end-point dilutions.

Adjuvant activity was present both with intramuscular and intraperitoneal treatments ($P<0.001$). However, a small dose of COAM only stimulated early induction of antibody (3 weeks), as the effect waned at 6, 9 and 12 weeks (interaction between bleeding time and treatment significant at level $P<0.001$).

The requirement for a higher dose in guinea pigs than in mice might have pointed to a systemic rather than a local mechanism. Therefore, in a last experiment, it was investigated whether COAM had adjuvant activity when injected at another site than the vaccine. Groups of 7 guinea pigs were given A equi/1 vaccine intraperitoneally or intravenously. COAM (40 mg. per dose) was included or given separately at a distant site. As Table IV shows, COAM had adjuvant activity only when given at the same injection site as the vaccine. It seems unlikely therefore that it acts by generalized stimulation of immunity mechanisms.

TABLE IV

Adjuvant effect of COAM on antibody induction by influenza vaccine in guinea pigs

| Vaccination schedule [1] | Antibody titer 3 weeks after vaccination [2] |
|---|---|
| Intramuscular vaccination: | |
| Vaccine only | 52 |
| Vaccine plus COAM, 40 mg | 195 |
| Vaccine plus COAM, 40 mg. i.p | 64 |
| Intraperitoneal vaccination: | |
| Vaccine only | 64 |
| Vaccine plus COAM, 40 mg | 182 |
| Vaccine plus COAM, 40 mg. i.r | 80 |

[1] Formulations were such that the animals received 0.5 ml. of A equi/1 vaccine, mixed with 0.5 ml. of either saline or COAM at the indicated doses.
[2] Serum samples were assayed individually. Values shown in the table are reciprocals of geometric means of end-point dilutions.

The vaccine adjuvants of this invention may be used to potentiate the effects of vaccines. They may be used with vaccines such as influenza, parainfluenza, polio, measles, mumps, hepatitis, Eastern and Western equine encephalomyelitis, feline viral rhinotracheitis, foot-and-mouth, cytomegaloviruses, feline picorna viruses, streptococcus, tetanus, diphteria, pertussis, colibacillosis, pasteurellosis and leptospira. They may in general be incorporated in the vaccines in amounts such that, when the appropriate amount of vaccine is administered, the dosage of adjuvant will be from about 1 mg./kg. to 200 mg./kg. The adjuvanted vaccines are administered by injection, preferably intraperitoneally or intramuscularly.

Adjuvants of this invention other than COAM include oxidized amylopectin (a branched condensation copolymer containing 1,4 and 1,6-linked anhydro-α-D-glucopyranose units and 1,4-linked anhydro-1,4-dihydroxy-1,4-dicarboxy-3-hydroxymethyl-2-oxabutane units), oxidized polygalacturonic acid (a linear condensation copolymer containing 1,4-linked anhydro-α-D-galacturonopyranose units and 1,4-linked anhydro-1,4-dihydroxy-1,3,4-tricarboxy-2-oxabutane units), oxidized alginic acid (a linear condensation copolymer containing 1,4-linked anhydro-β-D-mannuronopyranose units, 1,4-linked anhydro-α-L-guluronopyranose units, and 1,4-linked anhydro-1,4-dihydroxy-1,3,4-tricarboxy-2 - oxabutane units), oxidized cellulose (a linear condensation copolymer containing 1,4-linked-β-D-glucopyranose units and 1,4-linked anhydro-1,4 - dihydroxy - 1,4 - dicarboxy - 3 - hydroxymethyl-2-oxabutane units), oxidized dextran (a condensation copolymer containing 1,6-linked-α-D-glucopyranose units and 1,4-linked-anhydro-1,4-dihydroxy-1,3-dicarboxy-2-oxabutane units), and oxidized guaran (a condensation copolymer consisting of a linear chain of 1,4-linked anhydro-β-D-mannopyranose units and 1,4-linked anhydro-1,4-dihydroxy-1,4-dicarboxy - 3 - hydroxymethyl-2-oxabutane units).

In the following non limitative examples, the oxidation degree of the polysaccharide which determines the molar ratio of oxidized monosaccharide units vs. non oxidized monosaccharide units is obtained from the determination of the dialdehyde content of the intermediate compound, at the end of stage I, i.e. after the periodate oxidation step, since the second stage oxidation quantitatively converts the aldehyde groups present into carboxyl group, the oxidation degree (expressed in percent) is the same for the aldehyde derivative and for the carboxylic derivative.

EXAMPLE 1

A solution of 15.8 g. of sodium metaperiodate in 200 ml. of water is added with stirring to a suspension of 10 g. of amylose (dry basis) in 200 ml. of water. The slurry is stirred in the dark at 0° C. under nitrogen atmosphere. At regular intervals, the consumption of periodate is determined by the method of P. F. Fleury and J. Lange (J. Pharm. Chim. 17, 107 and 196 (1933)). As soon as the periodate concentration is stabilized (i.e. after 64 hrs.), the oxidized polysaccharide is collected on a buchner funnel, washed with water until free of iodate and then with absoute ethanol.

The precipitate is dried over phosphorous pentoxide at room temperature under reduced pressure to yield periodate oxidized amylose having an oxidation degree of 93% determined by the oxime method (E. K. Gladding and C. B. Purves, Tappi, 116, 150 (1943)).

An 8 g. (dry basis) aliquot of the periodate oxidized amylose is suspended in a mixture of 400 ml. of water, 45 g. of commercial grade sodium chlorite (80%) and 11.4 ml. of glacial acetic acid. The suspension is stirred for 3 hrs. at room temperature. After this reaction period, nitrogen is bubbled through the reaction mixture to remove the chlorine dioxide. The pH of the solution is adjusted to 8.3 with aqueous sodium hydroxide (2N) and filtered.

The filtrate is poured with stirring into 2900 ml. of absolute ethanol. The precipitate is dissolved in 75 ml. of water and poured into 550 ml. of absolute ethanol. The gummy precipitate is dissolved in 150 ml. of water and freeze dried to yield the sodium salt of a linear condensation copolymer containing 1,4-linked anhydro-α-D-glucopyranose units and 1,4-linked anhydro-1,4-dihydroxy-1,4-dicarboxy-3-hydroxy-methyl-2-oxabutane units with a milli-equivalent COONa/g: 8.05 and an intrinsic viscosity $[\eta]$: 0.75 (in 0.2N NaOH at 30.3° C.) expressed in decilitre per gram.

EXAMPLE 2

A solution of 15.8 g. of sodium metaperiodate in 200 ml. of water is added with stirring to a suspension of 10 g. of amylose (dry basis) in 200 ml. of water. The slurry is stirred in the dark at 10° C. under nitrogen atmosphere. At regular intervals, the consumption of periodate is determined by the method of P. F. Fleury and J. Lange (J. Pharm. Chim. loc. cit.).

As soon as the periodate concentration is stabilized (i.e. after 64 hrs.), the oxidized polysaccharide is collected on a buchner funnel, washed with water until free of iodate and then with absolute ethanol.

The precipitate is dried over phosphorous pentoxide at room temperature under reduced pressure to yield periodate oxidized amylose having an oxidation degree of 98% determined by the oxime method (E. K. Gladding et al., loc. cit.).

A 8 g. (dry basis) aliquot of the periodate oxidized amylose is suspended in a mixture of 400 ml. of water, 45 g. of commercial grade sodium chlorite (80%) and 11.4 ml. of glacial acetic acid. The suspension is stirred for 3 hrs. at room temperature. After this reaction period, nitrogen is bubbled through the reaction mixture to remove the chlorine dioxide. The pH of the solution is adjusted to 8.3 with aqueous sodium hydroxide (2N) and filtered.

The filtrate is poured with stirring into 2900 ml. of absolute ethanol. The precipitate is dissolved in 75 ml. of water and poured into 550 ml. of absolute ethanol. The gummy precipitate is dissolved in 150 l. of water and freeze dried to yield the sodium salt of a linear condensation copolymer containing 1,4-linked anhydro-α-D-glucopyranose units and 1,4-linked anhydro-1,4-dihydroxy-1,4-dicarboxy-3-hydroxy-methyl-2-oxabutane units with a milli-equivalent COONa/g: 8.36 and an intrinsic viscosity $[\eta]$: 0.14 (in 0.2N NaOH at 30.3° C.) expressed in decilitre per gram.

EXAMPLE 3

A solution of 26.5 g. of sodium metaperiodate in 300 ml. of water is added with stirring to a suspension of 10 g. of amylose (dry basis) in 100 ml. of water. The pH is adjusted to 1 with normal hydrochloric acid. The slurry is stirred in the dark at room temperature under nitrogen atmosphere. At regular intervals, the consumption of periodate is determined by the method of P. F. Fleury and J. Lange (J. Pharm. Chim., loc. cit.). After a 3 hrs. reaction period, the oxidized polysaccharide is collected on a buchner funnel, washed with water until free of iodate and then with absolute ethanol.

The precipitate is dried over phosphorous pentoxide at room temperature under reduced pressure to yield periodate oxidized amylose having an oxidation degree of 88% determined by the oxime method (E. K. Gladding et al., loc. cit.).

A 8 g. (dry basis) aliquot of the periodate oxidized amylose is suspended in a mixture of 400 ml. of water, 45 g. of commercial grade sodium chlorite (80%) and 11.4 ml. of glacial acetic acid. The suspension is stirred for 3 hrs. at room temperature. After this reaction period, nitrogen is bubbled through the reaction mixture to remove the chlorine dioxide. The pH of the solution is adjusted to 8.3 with aqueous sodium hydroxide (2N) and filtered.

The filtrate is poured with stirring into 3 l. of absolute ethanol. The precipitate is dissolved in 100 ml. of water and poured into 700 ml. of absolute ethanol. The gummy precipitate is dissolved in 150 ml. of water and freeze dried to yield the sodium salt of a linear condensation copolymer containing 1,4-linked anhydro-α-D-glucopyranose units and 2,4-linked anhydro-1,4-dihydroxy-1,4-dicarboxy-3-hydroxy-methyl-2-oxabutane units with a milli-equivalent COONa/g.: 7.75 and an intrinsic viscosity $[\eta]$: 0.74 (0.2N NaOH at 30.3° C.) expressed in decilitre per gram.

EXAMPLE 4

A solution of 13.25 g. of sodium metaperiodate in 300 ml. of water is added with stirring to a suspension of 10 g. of amylose (dry basis) in 100 ml. of water. The pH is adjusted to 1 with normal hydrochloric acid. The slurry is stirred in the dark at room temperature under nitrogen atmosphere. At regular intervals, the consumption of periodate is determined by the method of P. F. Fleury and J. Lange (J. Pharm. Chim., loc. cit.). After a 2 hours reaction period, the oxidized polysaccharide is collected on a buchner funnel, washed with water until free of iodate and then with absolute ethanol.

The precipitate is dried over phosphorous pentoxide at room temperature under reduced pressure to yield periodate oxidized amylose having an oxidation degree of 74% determined by the oxime methods (E. K. Gladding et al., loc. cit.).

A 8 g. (dry basis) aliquot of the periodate oxidized amylose is suspended in a mixture of 400 ml. of water, 45 g. of commercial grade sodium chlorite (80%) and 11.4 ml. of glacial acetic acid. The suspension is stirred for 4 hrs. at room temperature. After this reaction period, nitrogen is bubbled through the reaction mixture to remove the chlorine dioxide. The pH of the solution is adjusted to 8.3 with aqueous sodium hydroxide (2N) and filtered.

The filtrate is poured with stirring into 3 l. of absolute ethanol. The precipitate is dissolved in 100 ml. of water and poured into 700 ml. of absolute ethanol. The gummy precipitate is dissolved in 150 ml. of water and freeze dried to yield the sodium salt of a linear condensation copolymer containing 1,4-linked anhydro-alpha-D-glucopyranose units and 1,4-linked anhydro-1,4-dihydroxy-1,4-dicarboxy-3-hydroxymethyl-2-oxabutane units with a milli-equivalent COONa/g.: 6.82 and an intrinsic viscosity $[\eta]$: 1.05 (in 0.2N NaOH at 30.3° C.) expressed in decilitre per gram.

EXAMPLE 5

A solution of 19.87 g. of sodium metaperiodate in 300 ml. of water is added with stirring to a suspension of 10 g. of amylose (dry basis) in 100 ml. of water. The pH is adjusted to 1 with normal hydrochloric acid. The slurry is stirred in the dark at room temperature under nitrogen atmosphere. At regular intervals, the consumption of periodate is determined by the method of P. F. Fleury and J. Lange (J. Pharm. Chim., loc. cit.). After a 2 hours reaction period, the oxidized polysaccharide is collected on a buchner funnel, washed with water until free of iodate and then with absolute ethanol.

The precipitate is dried over phosphorous pentoxide at room temperature under reduced pressure to yield periodate oxidized amylose having an oxidation degree of 81% determined by the oxime method (E. K. Gladding et al., loc. cit.).

A 8 g. (dry basis) aliquot of the periodate oxidized amylose is suspended in a mixture of 400 ml. of water, 45 g. of commercial grade sodium chlorite (80%) and 11.4 ml. of glacial acetic acid. The suspension is stirred for 4 hrs. at room temperature. After this reaction period, nitrogen is bubbled through the reaction mixture to remove the chlorine dioxide. The pH of the solution is adjusted to 8.3 with aqueous sodium hydroxide (2N) and filtered. The filtrate is poured with stirring into 3 l. of absolute ethanol. The precipitate is dissolved in 100 ml. of water and poured into 700 ml. of absolute ethanol. The gummy precipitate is dissolved in 150 ml. of water and freeze dried to yield the sodium salt of a linear condensation copolymer containing 1,4-linked anhydro-alpha-D-glucopyranose units and 1,4-linked anhydro-1,4-dihydroxy - 1,4 - dicarboxy-3-hydroxymethyl - 2 - oxabutane units with a milli-equivalent COONa/g.: 7.3 and an intrinsic viscosity $[\eta]$: 0.87 (in 0.2N NaOH at 30.3° C.) expressed in decilitre per gram.

EXAMPLE 6

A solution of 9.94 g. of sodium metaperiodate in 300 ml. of water is added with stirring to a suspension of 10 g. of amylose (dry basis) in 100 ml. of water. The pH is adjusted to 1 with normal hydrochloric acid. The slurry is stirred in the dark at room temperature under nitrogen atmosphere. At regular intervals, the consumption of periodate is determined by the method of P. F. Fleury and J. Lange (J. Pharm. Chim., loc. cit.). After a two hours reaction period, the oxidized polysaccharide is collected on a buchner funnel, washed with water until free of iodate and then with absolute ethanol.

The precipitate is dried over phosphorous pentoxide at room temperature under reduced pressure to yield periodate oxidized amylose having an oxidation degree of 64% determined by the oxime method (E. K. Gladding et al., loc. cit.).

A 8 g. (dry basis) aliquot of the periodate oxidized amylose is suspended in a mixture of 400 ml. of water, 45 g. of commercial grade sodium chlorite (80%) and 11.4 ml. of glacial acetic acid. The suspension is stirred for 4 hrs. at room temperature. After this reaction period, nitrogen is bubbled through the reaction mixture to remove the chlorine dioxide. The pH of the solution is adjusted to 8.3 with aqueous sodium hydroxide (2N). The gelatinous precipitate is removed by centrifugation and the supernatant is poured with stirring into 3 l. of absolute ethanol.

The precipitate is dissolved in 100 ml. of water and poured into 700 ml. of absolute ethanol. The gummy precipitate is dissolved in 150 ml. of water and freeze dried to yield the sodium salt of a linear condensation copolymer containing 1,4-linked anhydro-α-D-glucopyranose units and 1,4-linked anhydro-,4-dihydroxy-1,4-dicarboxy-3-hydroxymethyl-2-oxabutane units with a milli-equivalent COONa/g.: 6.1 and an intrinsic viscosity $[\eta]$: 1.4 (in 0.2 N NaOH at 30.3° C.) expressed in decilitre per gram.

EXAMPLE 7

A solution of 33.125 g. of sodium metaperiodate in 300 ml. of water is added with stirring to a suspension of 10 g. of amylose (dry basis) in 100 ml. of water. The pH is adjusted to 1 with normal hydrochloric acid. The slurry is stirred in the dark at room temperature under nitrogen atmosphere. At regular intervals, the consumption of periodate is determined by the method of P. F. Fleury and J. Lange (J. Pharm. Chim., loc. cit.). After a four hours reaction period, the oxidized polysaccharide is collected on a buchner funnel, washed with water until free of iodate and then with absolute ethanol.

The precipitate is dried over phosphorous pentoxide at room temperature under reduced pressure to yield periodate oxidized amylose having an oxidation degree of 98% determined by the oxime method (E. K. Gladding et al., loc. cit.).

A 8 g. (dry basis) aliquot of the periodate oxidized amylose is suspended in a mixture of 400 ml. of water, 45 g. of commercial grade sodium chlorite (80%) and 11.4 ml. of glacial acetic acid. The suspension is stirred for 3 hrs. at room temperature. After this reaction period, nitrogen is bubbled through the reaction mixture to remove the chlorine dioxide. The pH of the solution is adjusted to 8.3 with aqueous sodium hydroxide (2N) and filtered.

The filtrate is poured with stirring into 3 l. of absolute ethanol. The precipitate is dissolved in 100 ml. of water and poured into 700 ml. of absolute ethanol. The gummy precipitate is dissolved in 150 ml. of water and freeze dried to yield the sodium salt of a linear condensation copolymer containing 1,4-linked anhydro-α-D-glucopyranose units and 1,4-linked anhydro-1,4-dihydroxy-1,4-dicarboxy-3-hydroxy-methyl-2-oxabutane units with a milli-equivalent COONa/g.: 8.36 and an intrinsic viscosity $[\eta]$: 0.84 (in 0.2N NaOH at 30.3° C.) expressed in decilitre per gram.

EXAMPLE 8

A solution of 15.8 g. of sodium metaperiodate in 200 ml. of water is added with stirring to a solution of 8.77 g. of amylopectin (dry basis) in 200 ml. of water.

The solution is stirred in the dark at 0° C. under nitrogen atmosphere. At regular intervals, the consumption of periodate is determined by the method of P. F. Fleury and J. Lange (J. Pharm. Chim., loc. cit.). As soon as the periodate concentration is stabilized (i.e. after 40 hrs.), the residual periodate is reduced by addition of an equivalent amount of ethylene glycol. After a 3 hours reaction period, the solution is dialysed against water at 5° C., concentrated under reduced pressure at 15° C. to a volume of 150 ml. By addition of 300 ml. of t-butylalcohol, there is obtained a precipitate which is triturated with absolute ethanol, filtered and dried under reduced pressure to yield periodate oxidized amylopectin having an oxidation degree of 90% determined by the sodium borohydride method (J. C. Rankin and C. L. Mehltretter, Anal. Chem. 28, 1012, 1956).

A 3.8 g. (dry basis) aliquot of the periodate oxidized amylopectin is suspended in a mixture of 200 ml. of water, 45 g. of commercial grade sodium chlorite (80%) and 12 ml. of glacial acetic acid. The suspension is stirred for 4 hrs. at room temperature. After this reaction period, nitrogen is bubbled through the reaction mixture to remove the chlorine dioxide. The pH of the solution is adjusted to 8.3 with aqueous sodium hydroxide (2N) and filtered.

The filtrate is poured with stirring into 1500 ml. of absolute ethanol. The precipitate is dissolved in 80 ml. of water and poured into 550 ml. of absolute ethanol.

The gummy precipitate is dissolved in 200 ml. of water and freeze dried to yield the sodium salt of a branched condensation copolymer containing 1,4 and 1,6-linked anhydro-α-D-glucopyranose units and 1,4-linked anhydro-1,4-dihydroxy-1,4-dicarboxy-3-hydroxymethyl-2-oxabutane units with a milli-equivalent COONa/g.: 7.89 and an intrinsic viscosity $[\eta]$: 0.75 (in 0.2 N NaOH at 30.3° C.) expressed in decilitre per gram.

EXAMPLE 9

A solution of 5.9 g. of sodium metaperiodate in 150 ml. of water is added with stirring to a solution of 5.1 g. of polygalacturonic acid (dry basis) in 50 ml. of water.

The solution is stirred in the dark at 0° C. under nitrogen atmosphere. At regular intervals the consumption of periodate is determined by the method of P. F. Fleury and J. Lange (J. Pharm. Chim., loc. cit.). As soon as the periodate concentration is stabilized (i.e. after 42 hrs.), the residual periodate is reduced by addition of an equivalent amount of ethylene glycol. After a 3 hours reaction period, the solution is dialysed against water at 5° C., concentrated under reduced pressure at 15° C. to a volume of 100 ml. By addition of 250 ml. of t-butylalcohol, there is obtained a precipitate which is triturated with absolute ethanol, filtered and dried under reduced pressure to yield periodate oxidized polygalacturonic acid having an oxidation degree of 64% determined by the borohydride method (J. C. Rankin and C. L. Mehltretter, loc. cit.).

A 2.75 g. (dry basis) aliquot of the periodate oxidized polygalacturonic acid is suspended in a mixture of 136 ml. of water, 15.3 g. of commercial grade sodium chlorite (80%) and 4.1 ml. of glacial acetic acid. The suspension is stirred for 4 hrs. at room temperature. After this reaction period, nitrogen is bubbled through the reaction mixture to remove the chlorine dioxide. The pH of the solution is adjusted to 8.3 with aqueous sodium hydroxide (2N) and filtered. The filtrate is poured with stirring into 850 ml. of absolute ethanol. The precipitate is dissolved in 25 ml. of water and poured into 150 ml. of absolute ethanol. The gummy precipitate is dissolved into 75 ml. of water and freeze dried to yield the sodium salt of a linear condensation copolymer containing 1,4-linked anhydro-α-D-galacturonopyranose units and 1,4-linked anhydro-1,4-dihydroxy-1,3,4-tricarboxy-2-oxabutane units with a milli-equivalent COONa/g.: 9.37 and an intrinsic viscosity $[\eta]$: 0.14 (in 0.2 N NaOH at 30.3° C.) expressed in decilitre per gram.

EXAMPLE 10

A solution of 7.9 g. of sodium metaperiodate in 150 ml. of water is added with stirring to a solution of 4.6 g. of alginic acid in 50 ml. of water. The solution is stirred in the dark at 0° C. under nitrogen atmosphere. At regular intervals the consumption of periodate is determined by the method of P. E. Fleury and J. Lange (J. Pharm. Chim., loc. cit.). As soon as the periodate concentration is stabilized (i.e. after 23 hrs.) the residual periodate is reduced by addition of an equivalent amount of ethylene glycol. After a 3 hours reaction period, the solution is dialysed against water at 5° C., concentrated under reduced pressure at 15° C. to a volume of 100 ml. By addition of 250 ml. of t-butylalcohol, there is obtained a precipitate which is triturated with absolute ethanol, filtered and dried under reduced pressure to yield periodate oxidized alginic acid having an oxidation degree of 58.6% determined by the sodium borohydride method (J. C. Rankin and C. L. Mehltretter, loc. cit.).

A 2.7 g. (dry basis) aliquot of the periodate oxidized alginic acid is suspended in a mixture of 80 ml. of water, 9 g. of commercial grade sodium chlorite (80%) and 2.4 ml. of glacial acetic acid. The suspension is stirred for 3 hrs. at room temperature. After this reaction period nitrogen is bubbled through the reaction mixture to remove the chlorine dioxide. The pH of the solution is adjusted to 8.3 with aqueous sodium hydroxide (2N) and filtered. The filtrate is poured with stirring into 400 ml. of absolute ethanol.

The precipitate is dissolved in 16 ml. of water and poured into 200 ml. of absolute ethanol. The gummy precipitate is dissolved in 120 ml. of water and freeze dried to yield the sodium salt of a linear condensation copolymer containing 1,4-linked anhydro-β-D-mannuronopyranose units, 1,4-linked anhydro-α-L-galacturonopyranose units and 1,4-linked anhydro-1,4-dihydroxy-1,3,4-tricarboxy-2-oxabutane units with milliequivalent COONa/g.: 9.00 and an intrinsic viscosity $[\eta]$: 0.23 (in 0.2 N NaOH at 30.3° C.) expressed in decilitre per gram.

EXAMPLE 11

To a solution of 10.6 g. of sodium metaperiodate in 250 ml. of water there is added 5 g. of powdered cellulose. The slurry is shaken in the dark at room temperature under nitrogen atmosphere. At regular intervals the periodate is determined by the method of P. F. Fleury and J. Lange (J. Pharm. Chim., loc. cit.). After a 84 hours reaction period, the oxidized cellulose is filtered on fritted glass, washed with water until free of iodate and then with absolute ethanol. The precipitate is dried over phosphorous pentoxide at room temperature under reduced pressure to yield periodate oxidized cellulose with an oxidation degree of 88% determined by the oxime method (E. K. Gladding et al. loc. cit.).

A 1 g. (dry basis) aliquot of the periodate oxidized cellulose is suspended in a mixture of 50 ml. of water, 5.62 g. of commercial sodium chlorite (80%) and 1.5 ml. of glacial acetic acid.

The suspension is stirred for 3 hrs. at room temperature. After this reaction period, nitrogen is bubbled through the reaction medium to remove the chlorine dioxide. The reaction mixture is poured with stirring into 250 ml. of absolute ethanol. The precipitate is filtered, washed with absolute ethanol and dried.

In order to avoid degradation of the obtained product in alkaline medium, the residual aldehyde functions are reduced with sodium borohydride. Therefore, a 1 g. aliquot is suspended in 50 ml. of a 0.112 M aqueous solution of sodium borohydride. The reaction mixture is shaken for 20 hrs. at room temperature. After this reaction period, the pH is adjusted to 5.5 with acetic acid.

The acidified suspension is poured with stirring into 200 ml. of absolute ethanol. The precipitate is suspended into 100 ml. of water and the pH of the suspension is adjusted to 8.3 with aqueous sodium hydroxide (2N). The suspension is filtered on fritted glass and the filtrate is dialysed against water. The dialysate is freeze dried to yield the sodium salt of a linear condensation copolymer containing 1,4-linked-β-D-glucopyranose units and 1,4-linked anhydro-1,4-dihydroxy-1,4-dicarboxy-3-hydroxymethyl-2-oxabutane units with a milliequivalent COONa/g:7.7 and an intrinsic viscosity $[\eta]$:0.249 (in 0.2 N NaOH at 30.3° C.) expressed in decilitre per gram.

EXAMPLE 12

A solution of 24.8 g. of sodium metaperiodate in 225 ml. of water is added to a stirred suspension of 7.5 g. of amylose (dry basis) in 75 ml. of water. The pH of the medium is adjusted to 1 with normal hydrochloride acid.

The slurry is stirred in the dark at room temperature under nitrogen atmosphere. At regular intervals, the consumption of periodate is determined by the method of P. F. Fleury and J. Lange (J. Pharm. Chim., loc. cit.).

After a 3 hours reaction period, the oxidized polysaccharide is collected on a buchner funnel, washed with water until free of iodate and then with absolute ethanol.

The precipitate is dried over phosphorous pentoxide at room temperature under reduced pressure to yield periodate oxidized amylose having an oxidation degree of 82.2% determined by the oxime method (E. K. Gladding et al., loc. cit.).

A 2.37 g. (dry basis) aliquot of the periodate oxidized amylose is suspended in 26.5 ml. of carbon tetrachloride containing 42.55 g. of dinitrogen tetroxide. The suspension is stirred for 24 hrs. at 20° C. After this reaction period, the medium is filtered, the precipitate is washed with carbon tetrachloride and suspended in 150 ml. of water. The pH of the suspension is adjusted to 9 by addition of sodium hydroxide. After heating on a steam bath for 10 minutes, a clear solution is obtained. The pH of the solution is adjusted to 8.3 and the solution is poured with stirring into 2100 ml. of absolute ethanol. The precipitate is dissolved in 200 ml. of water and the filtrate is dialysed against water. The dialysate is freeze dried to yield the sodium salt of a linear condensation copolymer containing 1,4 - linked anhydro-α-D-glucopyranose units and 1,4 - linked anhydro-1,4-dihydroxy-1,4-dicarboxy-3-hydroxymethyl-2-oxabutane units with a milli-equivalent COONa/g.:8.3 and an intrinsic viscosity $[\eta]$:0.05 (in 0.2 N NaOH at 30.3° C.) expressed in decilitre per gram.

EXAMPLE 13

Dextran (5 g.) having an average molecular weight (weight) of 150,000 is dissolved in a solution of 16 g. of sodium metaperiodate in 375 ml. of a sodium acetate/hydrochloric acid buffer at pH 3.6.

The solution is stirred in the dark at 0° C. under nitrogen atmosphere. At regular intervals, the consumption of periodate is determined by the method of P. F. Fleury and J. Lange (J. Pharm. Chim., loc. cit.). As soon as the periodate concentration is stabilized (i.e. after 24 hrs.), the residual periodate is reduced by addition of an equivalent amount of ethylene glycol. After a 3 hours reaction period, the solution is dialysed against water at 5° C., concentrated under reduced pressure at 15° C. to a volume of 85 ml. By addition of 250 ml. of t-butylalcohol, there is obtained a precipitate which is triturated with absolute ethanol, filtered and dried under reduced pressure to yield periodate oxidized dextran having an oxidation degree of 91%, determined by the oxime method (E. K. Gladding et al., loc. cit.).

A 2.72 g. (dry basis) aliquot of the periodate oxidized dextran is suspended in a mixture of 200 ml. of water, 22.50 g. of commercial grade sodium chlorite (80%) and 6 ml. of glacial acetic acid. The suspension is stirred for 4 hrs. at room temperature. After this reaction period, nitrogen is bubbled through the reaction mixture to remove the chlorine dioxide. The pH of the solution is adjusted to 8.3 with aqueous sodium hydroxide (2N) and filtered.

The filtrate is poured with stirring into 1 l. of absolute ethanol, the precipitate is dissolved in 45 ml. of water and poured into 270 ml. of absolute ethanol. The gummy precipitate is dissolved in 75 ml. of water, and freeze dried to yield the sodium salt of a condensation copolymer containing 1,6 - linked-α-D-glucopyranose units and 1,4-linked-anhydro-1,4-dihydroxy-1,3-dicarboxy - 2 - oxabutane units with a milli-equivalent COONa/g:9.037 and an intrinsic viscosity $[\eta]$:0.66 (in 0.2 N NaOH at 30.3° C.) expressed in decilitre per gram.

EXAMPLE 14

Dextran (5 g.) having an average molecular weight (weight) of 500,000 is dissolved in a solution of 16 g. of sodium metaperiodate in 375 ml. of a sodium acetate/hydrochloric acid buffer at pH 3.6.

The solution is stirred in the dark at 0° C. under nitrogen atmosphere. At regular intervals, the consumption of periodate is determined by the method of P. F. Fleury and J. Lange (J. Pharm. Chim., loc. cit.). As soon as the periodate concentration is stabilized (i.e. after 24 hrs.), the residual periodate is reduced by addition of an equivalent amount of ethylene glycol. After a 3 hours reaction period, the solution is dialysed against water at 5° C., concentrated under reduced pressure at 15° C. to a volume of 75 ml. By addition of 400 ml. of t-butylalcohol there is obtained a precipitate which is triturated with absolute ethanol, filtered and dried under reduced pressure to yield periodate oxidized dextran having an oxidation degree of 89.5%, determined by the oxime method (E. K. Gladding et al., loc. cit.).

A 2.75 g. (dry basis) aliquot of the periodate oxidized dextran is suspended in a mixture of 200 ml. of water, 22.5 g. of commercial grade sodium chlorite (80%) and 6 ml. of glacial acetic acid. The suspension is stirred for 4 hrs. at room temperature. After this reaction period, nitrogen is bubbled through the reaction mixture to remove the chlorine dioxide. The pH of the solution is adjusted to 8.3 with aqueous sodium hydroxide (2N) and filtered.

The filtrate is poured with stirring into 1 l. of absolute ethanol, the precipitate is dissolved in 50 ml. of water and poured into 400 ml. of absolute ethanol. The gummy precipitate is dissolved in 75 ml. of water and freeze dried to yield the sodium salt of a condensation copolymer containing 1,6-linked-α-D-glucopyranose units and 1,4-linked-anhydro-1,4-dihydroxy-1,3-dicarboxy-2 - oxabutane units with a milli-equivalent COONa/g.:8.8 and an intrinsic viscosity $[\eta]$:1.13 (in 0.2 N NaOH at 30.3° C.) expressed in decilitre per gram.

EXAMPLE 15

Dextran (5 g.) having an average molecular weight (weight) of 2,000,000 is dissolved in a solution of 16 g. of sodium metaperiodate in 375 ml. of a sodium acetate/hydrochloric acid buffer at pH 3.6.

The solution is stirred in the dark at 0° C. under nitrogen atmosphere. At regular intervals, the consumption of periodate is determined by the method of P. F. Fleury and J. Lange (J. Pharm. Chim., loc. cit.). As soon as the periodate concentration is stabilized (i.e. after 24 hrs.), the residual periodate is reduced by addition of an equivalent amount of ethylene glycol. After a 3 hours reaction period, the solution is dialysed against water at 5° C., concentrated under reduced pressure at 15° C. to a volume of 75 ml. By addition of 400 ml. of t-butylalcohol, there is obtained a precipitate which is triturated with absolute ethanol, filtered and dried under reduced pressure to yield periodate oxidized dextran having an oxidation degree of 84%, determined by the oximes method (E. K. Gladding et al., loc. cit.).

A 2.8 g. (dry basis) aliquot of the peridate oxidized dextran is suspended in a mixture of 200 ml. of water, 22.5 g. of commercial grade sodium chloride (80%) and 6 ml. of glacial acetic acid. The suspension is stirred for 4 hrs. at room temperature. After this reaction period nitrogen is bubbled through the reaction mixture to remove the chlorine dioxide.

The pH of the solution is adjusted to 8.3 with aqueous sodium hydroxide (2N) and filtered. The filtrate is poured with stirring into 1 l. of absolute ethanol, the precipitate is dissolved in 70 ml. of water and poured into 400 ml. of absolute ethanol. The gummy precipitate is dissolved in 75 ml. of water and freeze dried to yield the sodium salt of a condensation copolymer containing 1,6-linked-α-D-glucopyranose units and 1,4-linked-anhydro-1,4-dihydroxy-1,3-dicarboxy-2-oxabutane units with a milli-equivalent COONa/g.:8.44 and an intrinsic viscosity $[\eta]$:1.29 (in 0.2 N NaOH at 30.3° C.) expressed in decilitre per gram.

EXAMPLE 16

To a solution of 3.52 g. of sodium metaperiodate in 200 ml. of water there is added one gram of guaran (dry basis) prepared from guar flour by the method of R. L. Whistler and J. W. Marx (Methods in Carbohydrate Chem. V, 143, 1965). The pH of the medium is adjusted to 1.6 with normal hydrochloric acid and stirred in the dark at room temperature under nitrogen atmosphere. At regular intervals the consumption of periodate is determined by the method of P. F. Fleury and J. Lange (J. Pharm. Chim., loc. cit.). As soon as the periodate concentration is stabilized (i.e. after 3½ hrs.) the solution is dialysed against water at 50° C., concentrated under reduced pressure at 15° C. and freeze dried to yield periodate oxidized guaran having an oxidation degree of 88% determined by the oxime method (E. K. Gladding et al., loc. cit.).

A 500 mg. (dry basis) aliquot of the periodate oxidized guaran is suspended in a mixture of 50 ml. of water, 5.62 g. of commercial grade sodium chlorite (80%) and 1.5 ml. of glacial acetic acid. The suspension is stirred for 4 hrs. at room temperature. After this reaction period, nitrogen is bubbled through the reaction mixture to remove the chlorine dioxide. The pH of the solution is adjusted to 8.3 with aqueous sodium hydroxide (2N) and filtered.

The filtrate is poured with stirring into 500 ml. of absolute ethanol. The precipitate is dissolved in 30 ml. water and poured into 210 ml. of absolute ethanol. The precipitate is collected and dried to yield a condensation copolymer consisting of a linear chain of 1,4-linked anhydro-β-D-mannopyrarose units and 1,4-linked anhydro-1,4-dihydroxy 1,4-dicarboxy-3-hydroxymethyl-2-oxabutane units with α-D-galactopyranosyl- and 4-hydroxy-1,3-dicarboxy-2-oxabutyl units as substituents of half of the hydroxymethyl functions of the main chain.

We claim:

1. An adjuvanted vaccine composition comprising a vaccine in combination with such an amount of an oxidized polysaccharide as will result in administration of 1 to 200 mg./kg. of said oxidized polysaccharide per dose of vaccine, said oxidized polysaccharide being an oxidized amylose, amylopectin, cellulose, alginic acid, polygalacturonic acid, or dextran and having one of the following formulas and a molecular weight of at least 5000:

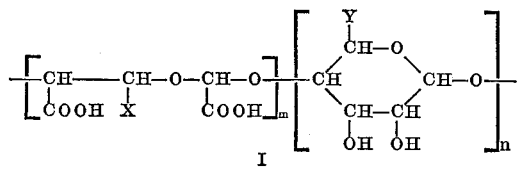

I

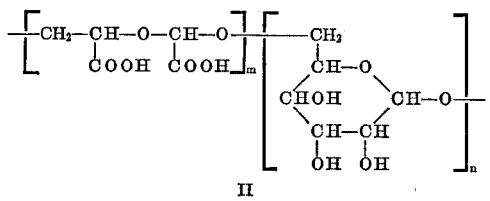

II where

X and Y are each $CH_2OH$ or COOH,
$m$ is between 0.6 and 1, and
$n$ is $1-m$.

2. An adjuvanted vaccine as claimed in claim 1, in which the oxidized polysaccharide is oxidized amylose.

3. An adjuvanted vaccine as claimed in claim 2, in which the vaccine is an influenza vaccine.

4. An adjuvanted vaccine as claimed in claim 3, in which the vaccine is influenza $A_2$ or B.

5. A method of increasing the antigenic potency of a vaccine by administering by injection a composition as claimed in claim 1.

6. A method as claimed in claim 5, in which the oxidized polysaccharide is an oxidized amylose.

7. A method as claimed in claim 6, in which the vaccine is influenza.

8. A method as claimed in claim 7, in which the vaccine is influenza.

9. A method as claimed in claim 8, in which the oxidized polysaccharide is present in an amount to provide a dose of about 160 mg./kg.

References Cited

UNITED STATES PATENTS 3,679,795   7/1972   DeSomer et al. _____ 424—180

OTHER REFERENCES

*Chemical Abstracts*, vol. 72, entry 119, 879v, 1970 citing Billiau et al., J. Virol. 1970, 5(3) 321-8.

RICHARD L. HUFF, Primary Examiner

U.S. Cl. X.R.

424—88, 92, 361